(12) United States Patent
Masao et al.

(10) Patent No.: US 6,347,321 B2
(45) Date of Patent: Feb. 12, 2002

(54) AUTOMATIC RE-REGISTRATION OF FILE SEARCH INFORMATION IN A NEW STORAGE MEDIUM

(75) Inventors: Nozomi Masao, Chichibu; Kazuo Otani, Kodaira, both of (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/055,245

(22) Filed: Apr. 6, 1998

(30) Foreign Application Priority Data

Apr. 9, 1997 (JP) .............................................. 9-090584

(51) Int. Cl.7 .............................................. G06F 17/30
(52) U.S. Cl. .......................................... 707/200; 707/3
(58) Field of Search ................................. 707/200, 205, 707/1–5

(56) References Cited

U.S. PATENT DOCUMENTS

| | | | | |
|---|---|---|---|---|
| 5,309,420 A | * | 5/1994 | Jaquette et al. ............... | 369/58 |
| 5,384,701 A | * | 1/1995 | Stentiford et al. ............. | 704/3 |
| 5,438,657 A | * | 8/1995 | Nakatani ...................... | 707/506 |
| 5,537,592 A | * | 7/1996 | King et al. ................... | 707/200 |
| 5,765,131 A | * | 6/1998 | Stentiford et al. ........... | 704/277 |
| 6,178,416 B1 | * | 1/2001 | Thompson et al. ............. | 707/3 |
| 6,178,419 B1 | * | 1/2001 | Legh-Smith et al. .......... | 707/6 |
| 6,212,522 B1 | * | 4/2001 | Himmel et al. ............... | 707/10 |
| 6,247,021 B1 | * | 6/2001 | Himmel et al. ............. | 707/104 |
| 6,256,639 B1 | * | 7/2001 | Himmel et al. ............. | 707/104 |
| 6,289,337 B1 | * | 9/2001 | Davies et al. .................. | 707/3 |

* cited by examiner

*Primary Examiner*—Maria N. Von Buhr
(74) *Attorney, Agent, or Firm*—Fitzpatrick, Cella, Harper & Scinto (57) ABSTRACT

When the quantity of information recorded in a first storage medium reaches the uppermost limit on the quantity of recordable information, a hierarchical structure and a keyword candidate list registered in the first storage medium are recorded in an internal storage unit. Then, after the first storage medium is replaced by a new second storage medium, the hierarchical structure and the keyword candidate list recorded in the internal storage unit are automatically registered in the new second storage medium.

21 Claims, 7 Drawing Sheets

EXAMPLES OF HIERARCHICAL STRUCTURE INFORMATION

EXAMPLE 1

| ROW NUMBER | STRUCTURE |
|---|---|
| 1 | HIERARCHY 0 * HIERARCHY 1 |
| 2 | HIERARCHY 0 * HIERARCHY 1 * HIERARCHY 2 |
| 3 | HIERARCHY 0 * HIERARCHY 1 * HIERARCHY 2 * HIERARCHY 3 |
| 4 | HIERARCHY 0 * HIERARCHY 1 * HIERARCHY 4 |
| 5 | HIERARCHY 0 * HIERARCHY 5 |
| 6 | HIERARCHY 0 * HIERARCHY 5 * HIERARCHY 6 |
| 7 | HIERARCHY 0 * HIERARCHY 5 * HIERARCHY 6 * HIERARCHY 7 |
| 8 | HIERARCHY 0 * HIERARCHY 5 * HIERARCHY 8 |

EXAMPLE 2 (OBTAINED BY SIMPLIFYING EXAMPLE 1)

| ROW NUMBER | STRUCTURE |
|---|---|
| 1 | HIERARCHY 0 * HIERARCHY 1 * HIERARCHY 2 * HIERARCHY 3 |
| 2 | HIERARCHY 0 * HIERARCHY 1 * HIERARCHY 4 |
| 3 | HIERARCHY 0 * HIERARCHY 5 * HIERARCHY 6 * HIERARCHY 7 |
| 4 | HIERARCHY 0 * HIERARCHY 5 * HIERARCHY 8 |

PRIOR ART

FIG. 5

PRIOR ART

FIG. 6

PRIOR ART

FIG. 7

AUTOMATIC RE-REGISTRATION OF FILE SEARCH INFORMATION IN A NEW STORAGE MEDIUM

BACKGROUND OF THE INVENTION

1. Field of the Invention

The present invention relates to an information file apparatus which is suitable for inputting, classifying and recording image information, a method for recording the image file, and a storage medium storing recording procedure of the image file.

2. Related Background Art

Conventionally, there has been proposed an information file apparatus which converts numerous documents or the like into electronic data and writes the converted data into a storage medium such as a magneto-optical disk or the like.

Figure 5:
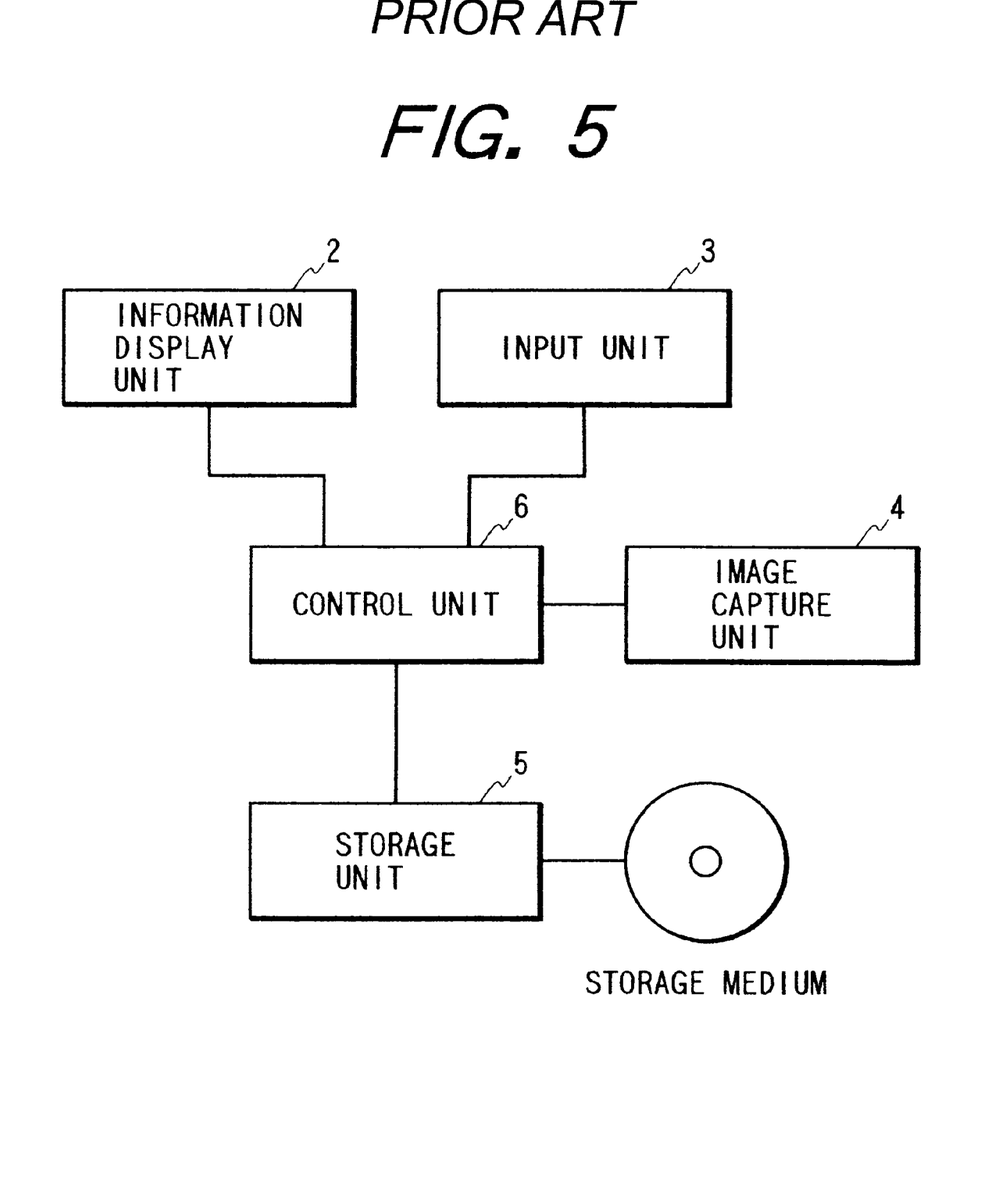
FIG. 5 is a block diagram showing an example of a conventionally known information file apparatus.

FIG. 5 is a block diagram showing the information file apparatus conventionally known. In FIG. 5, reference numeral 2 denotes an information display unit such as a display or the like which displays an operation menu, an operation result or the like to a user. Reference numeral 3 denotes an input unit such as a keyboard, a mouse or the like which inputs operation information by the user. Reference numeral 4 denotes an image capture unit such as a scanner or the like which captures or fetches image information. Reference numeral 5 denotes a storage unit to which a detachable storage medium such as a magneto-optical disk, a CD-R or the like for storing an image file composed of the image information captured by the image capture unit 4 is set. Reference numeral 6 denotes a control unit which has a function to execute control software or the like controlling the information display unit 2, the input unit 3, the image capture unit 4 and the storage unit 5.

In this information file apparatus, the user forms hierarchical structure in the storage unit 5 in advance by using the input unit 3.

Figure 6:
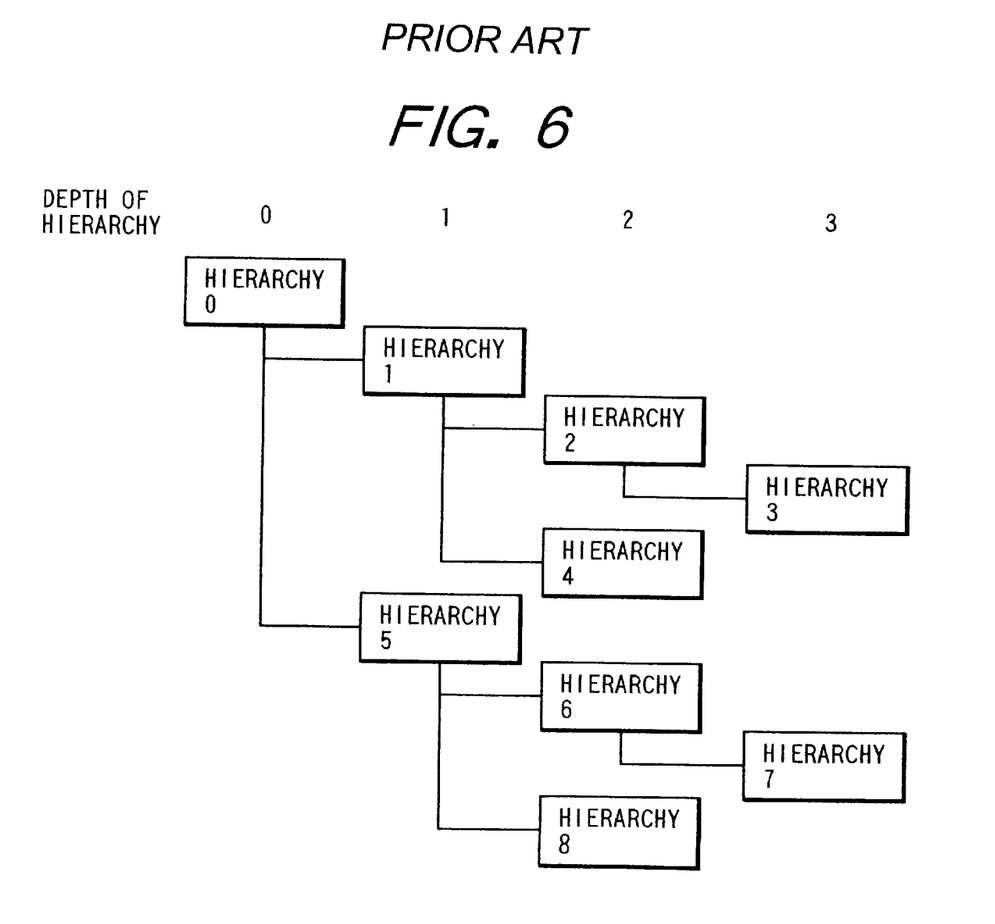
FIG. 6 is a view showing an example of hierarchical structure in a conventionally known file system.

FIG. 6 shows an example of the known hierarchical structure in a conventionally known file system. A hierarchy is to classify the image information in tree structure according to the contents of the image information, and is formed to enable the user to easily search the image file later. Depth of the hierarchy can be arbitrarily formed, and each hierarchy can have plural image files and plural child hierarchies for each.

In a case of capturing the image information through the image capture unit 4, initially, the user selects a keyword of the image information intended to be recorded from a previously prepared keyword candidate list by using the input unit 3, or directly inputs a new keyword not in the keyword candidate list.

Figure 7:
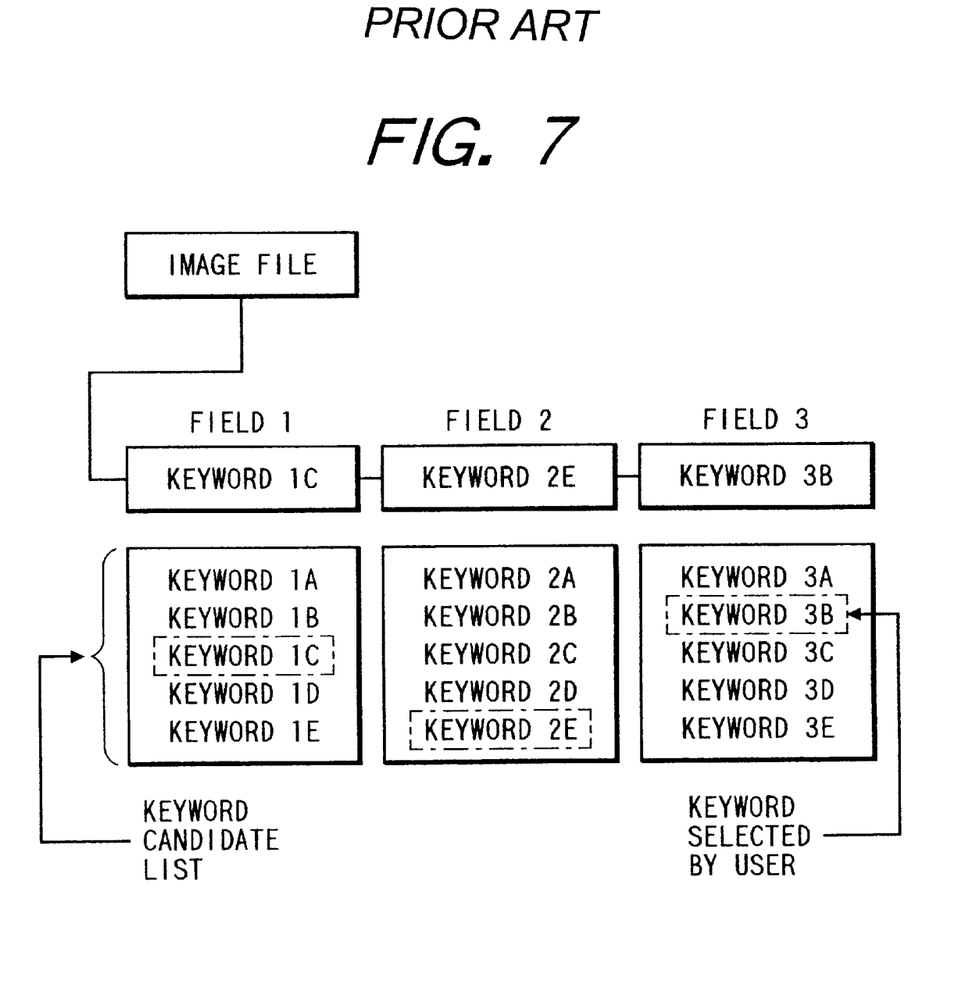
FIG. 7 is a view showing an example of keyword candidate lists.

FIG. 7 shows an example of the keyword candidate list. The keyword is used when the image information is later searched, and is a character string according to the contents of the image information. One image file has plural fields, and one keyword can be recorded in each field.

When the user instructs the image capture unit 4 to capture the image information, the control unit 6 controls such the capturing of the image information. Then, the image file is formed from the image information, the image file and the keyword are correlated with each other, and the image file is recorded in the designated hierarchy of the storage medium set in the storage unit 5. As above, the image file and search information (hierarchical structure, keyword) are written in the storage medium.

However, since an information quantity of the image file recordable in the storage medium is limited, when the information quantity already recorded reaches such an upper limit, the storage medium must be replaced by a new one. In this case, the hierarchical structure and the keyword candidate list formed for the former storage medium depend on the user's working environment, and such working environment does not change even if the former storage medium is replaced by a new one. Therefore, ordinarily, the hierarchical structure and keyword candidate list once formed for the former storage medium ought to be used for the replaced new storage medium.

However, conventionally, since the hierarchical structure and the keyword candidate list formed to the former storage medium by the user are not at all reflected to the new storage medium, the user must again form the hierarchical structure and register the keyword candidate list to the new storage medium.

SUMMARY OF THE INVENTION

The present invention has been made in consideration of the above-described point, and an object of the present invention is to enable search information for one storage medium to be easily utilized as the search information for an other storage medium.

An another object of the present invention is to enable hierarchical structure and a keyword candidate list formed for one storage medium by a user to be easily shifted to an other storage medium.

That is, the present invention is to provide an information file apparatus which stores information together with search information for the information in a detachable storage medium, comprising:

readout means for reading the search information registered in an attached first storage medium;

storage means for storing the search information read by the readout means; and writing means for writing the search information stored in the storage means in an attached second storage medium.

Further, the present invention is to provide a method to register search information for an information file which stores information together with the search information for the information in a detachable storage medium, the method comprising:

a readout step of reading the search information registered in an attached first storage medium;

a storage step of storing the search information read in the readout step; and a writing step of writing the search information stored in the storage step in an attached second storage medium.

Furthermore, the present invention is to provide a storage medium which contains a program to control an information file storing information together with search information for the information in a detachable storage medium, the medium comprising:

readout means for reading the search information registered in an attached first storage medium;

storage means for storing the search information read by the readout means; and writing means for writing the search information stored in the storage means in an attached second storage medium.

The above and other objects of the present invention will become apparent from the following detailed description when read in conjunction with the accompanying drawings.

DETAILED DESCRIPTION OF THE PREFERRED EMBODIMENT

In the preferred embodiment of the present invention, when a quantity of information recorded in a first storage medium reaches the uppermost limit of the quantity of recordable information storable therein (or when a user wishes), a hierarchical structure and a keyword candidate list which have been registered in the first storage medium and are used as image file search information are recorded in an internal storage unit. Then, after the first storage medium is replaced by a new storage medium (i.e., second storage medium), the hierarchical structure and the keyword candidate list recorded in the internal storage unit are automatically registered in the new second storage medium. Thus, the hierarchical structure and the keyword candidate list can be easily shifted from the first storage medium to the second storage medium without the user performing any complicated operation for such re-registration.

Hereinafter, the present embodiment of the present invention will be explained in detail with reference to FIGS. 1 to 4.

Figure 1:
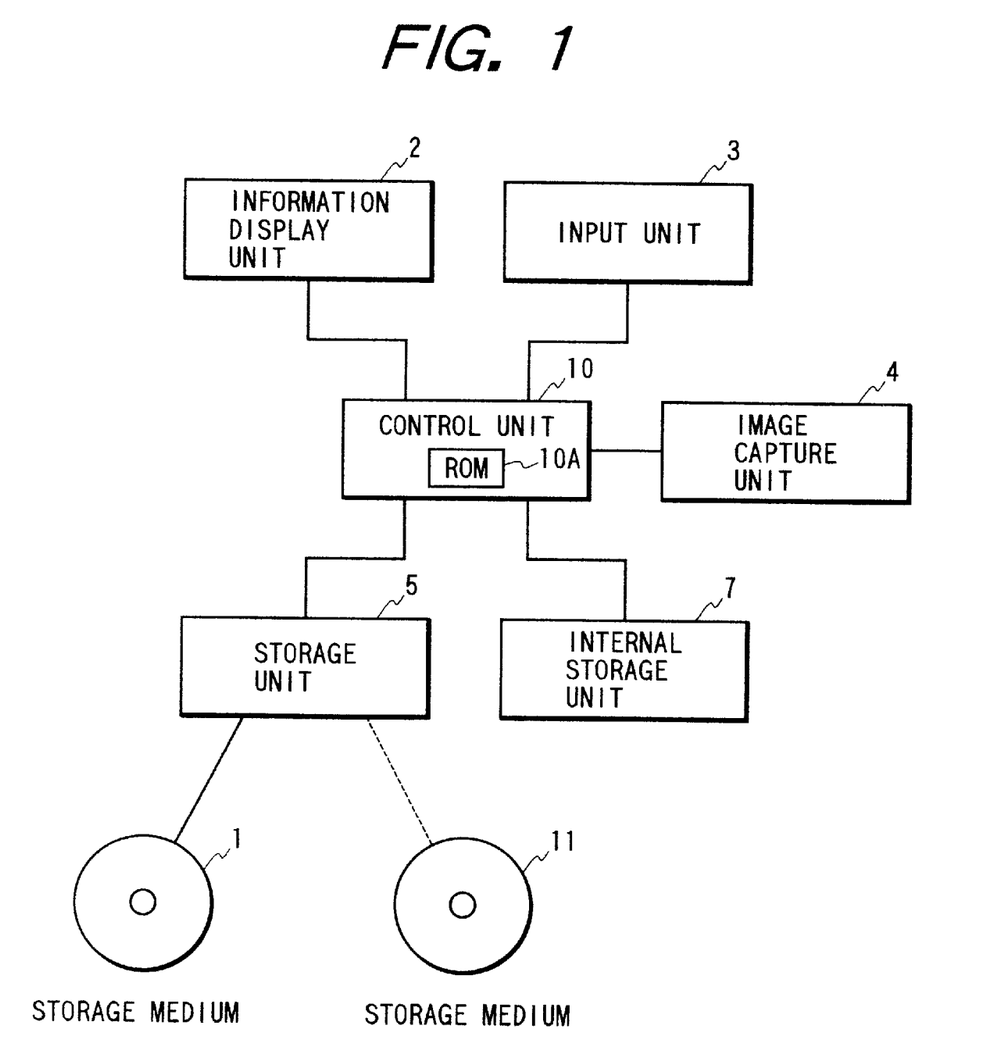
FIG. 1 is a block diagram showing an example of an information file apparatus to which the present invention is applied.

FIG. 1 is a block diagram showing an information file apparatus to which the present invention is applied. In FIG. 1, reference numeral 2 denotes an information display unit such as a display or the like which displays an operation menu, an operation result or the like to a user. Reference numeral 3 denotes an input unit such as a keyboard, a mouse or the like which inputs operation information by the user. Reference numeral 4 denotes an image capture unit such as a scanner or the like which captures or obtains image information. Reference numeral 5 denotes a storage unit in which a detachable storage medium such as a magneto-optical disk, a CD-R or the like for storing an image file recording therein the image information captured from the image capture unit 4 is set. Reference numeral 7 denotes an internal storage unit such as a hard disk or the like which stores the hierarchical structure information and the keyword candidate list formed for a first storage medium 1. Reference numeral 10 denotes a control unit which has functions to control the information display unit 2, the input unit 3, the image capture unit 4, the storage unit 5 and the internal storage unit 7. Control procedures (later described in detail) shown in FIGS. 2 and 3 have been stored in an internal memory (ROM) 10A of the control unit 10, in the form of programs. That is, the control procedure to store in the internal storage unit 7 the hierarchical structure and the keyword candidate list in the storage medium 1 set in the storage unit 5, and the control procedure to reproduce, in a storage medium 11 newly set to the storage unit 5, the hierarchical structure information and the keyword candidate list stored in the internal storage unit 7, have been stored in the ROM 10A of the control unit 10. Thus, the control unit 10 executes the controlling according to these control procedures.

The operation in the present embodiment will now be explained.

Initially, the user previously forms the hierarchical structure explained (or described) in FIG. 6 for the first storage medium 1 set to the storage unit 5, by using the input unit 3. Then, the user inputs a keyword concerning the image information to be recorded, by using the input unit 3, and instructs to capture the image information from the image capture unit 4.

The control unit 10 judges and processes the above operations to record the image file together with its keyword in the first storage medium 1 set to the storage unit 5.

Figure 2:
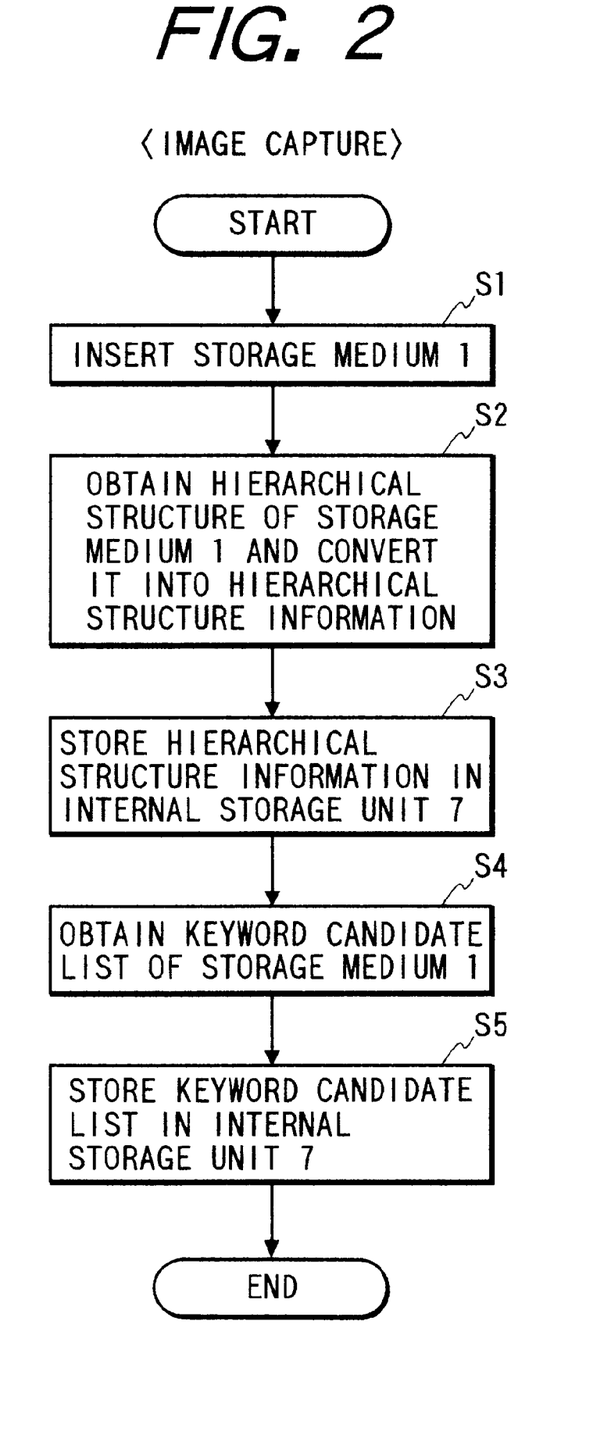
FIG. 2 is a flow chart showing an information capture procedure in the information file apparatus shown in FIG. 1.
Figure 3:
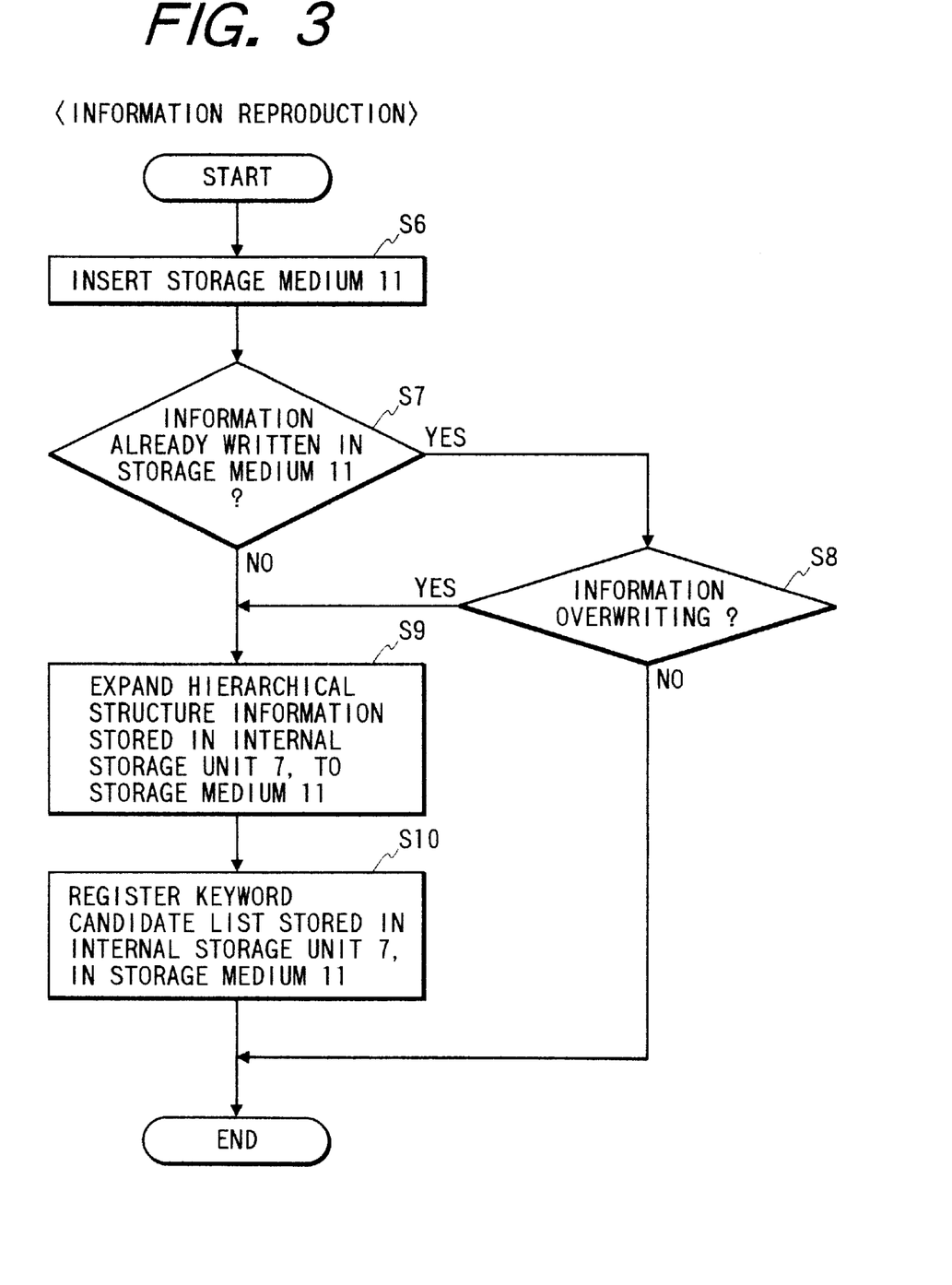
FIG. 3 is a flow chart showing a information reproduction procedure in the information file apparatus shown in FIG. 1.

FIGS. 2 and 3 are flow charts showing the control procedures in a case where the hierarchical structure and the keyword candidate list in the first storage medium 1 are shifted to the other storage medium 11 (to be referred as "second storage medium 11" hereinafter).

Initially, in a step S1 of FIG. 2, the user inserts the first storage medium 1 in the information file apparatus and instructs the apparatus to shift the hierarchical structure and the keyword candidate list from the first storage medium 1 to the internal storage unit 7.

Figure 4:
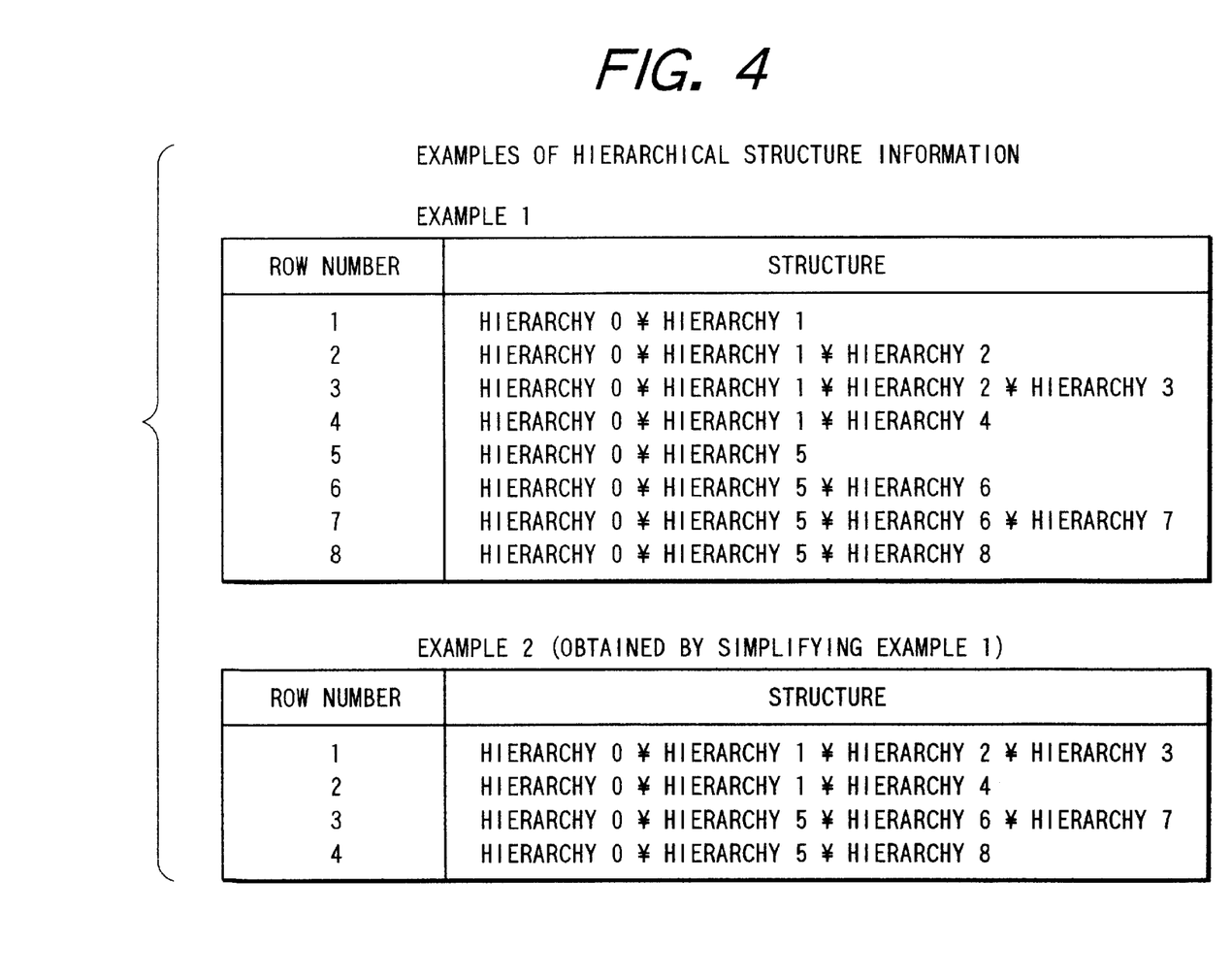
FIG. 4 is a view showing an example of hierarchically structured information.

In a step S2, the hierarchical structure in the first storage medium 1 is checked and read, and then converted into such hierarchical structure information as shown in FIG. 4 (present embodiment corresponding to hierarchical structure shown in FIG. 6). In a step S3, the obtained hierarchical structure information is stored in the internal storage unit 7. In a subsequent step S4, the keyword candidate list in the first storage medium 1 is obtained, and then in a step S5 the obtained keyword candidate list is stored in the internal storage unit 7.

By the above operations, the process to obtain or fetch the information terminates.

In a subsequent step S6 of FIG. 3, instead of the first storage medium 1, the user inserts the second storage medium 11 in the storage unit 5. In a step S7, it is checked whether or not the hierarchical structure and the keyword candidate list have already been written in the second storage medium 11. If written, in order to prevent overwriting of the information, in a step S8 an alarm is outputted to the user to ask if the information can be overwritten in the second storage medium 11. In response to the alarm, if the user instructs to forcedly shift the information from the medium 1 to the medium 11, or if no information is yet written in the medium 11, in a step S9 the hierarchical structure stored in the internal storage unit 7 is reproduced and written in the second storage medium 11 as the new hierarchical structure. Further, in a step S10, the keyword candidate list is also reproduced and written in the second storage medium 11. On the other hand, in the step S8, if the user does not wish to overwrite the information in the medium 11, the process shown in FIG. 3 terminates.

In such a manner as above, the hierarchical structure and the keyword candidate list in the first storage medium 1 are shifted to the second storage medium 11.

As described above, in the conventional method, when the quantity of the information recorded in the former storage medium reaches the uppermost limit on the quantity of recordable information and thus the former storage medium is replaced by the new storage medium, since the hierarchical structure and the keyword candidate list which have been formed by the user for the former storage medium and are the image file search information cannot be shifted to the new storage medium, the hierarchical structure and the keyword candidate list must be registered again in the new storage medium. On the other hand, according to the present embodiment, the internal storage unit 7 is provided, the hierarchical structure information and the keyword candidate list for the first storage medium 1 are stored in the internal storage unit 7, the first storage medium 1 is replaced by the new second storage medium 11, and then the hierarchical structure information and the keyword candidate list stored in the internal storage unit 7 are automatically registered in the second storage medium 11. Therefore, even if the user himself does not perform any re-registration of the information, the necessary information can be shifted from the former medium 1 to the new medium 11, whereby efficiency in filing can be improved without any complicated operation.

The present invention can be applied to a system consisting of plural units of equipment, and also to an apparatus consisting of one unit of equipment. Further, it will be obviously understood that the present invention can be applied to a case which is realized by supplying a program to the system or the apparatus. In this case, the system or the apparatus can derive the effect of the present invention by reading a storage medium storing therein the program represented by a software to realize the present invention.

As explained above, according to the present invention, the hierarchical structure and the keyword candidate list (acting as search information) which have been formed by the user for one storage medium can be easily shifted to the other storage medium without any complicated operation.

Although the present invention has been described above with respect to the preferred embodiment, the present invention is not limited to the foregoing embodiment but many modifications and variations are possible within the spirit and scope of the appended claims.

What is claimed is:

1. An information file apparatus which stores information files together with search information, which is used for searching the information files later, in a detachable storage medium, comprising:

a readout component, arranged to read out the search information registered in an attached first storage medium;

a storage, arranged to receive and store the search information read by said readout component;

a checker, arranged to check whether or not search information has already been written in an attached second storage medium; and a writing component, arranged to write the search information stored in said storage in the attached second medium, so as to use as search information for the attached second storage medium, where it is determined by said checker that search information is not yet written in the attached second storage medium, wherein said readout component reads a keyword candidate list as the search information, and wherein said writing component writes, in the attached second storage medium, the keyword candidate list of the information files stored in the attached first storage medium to use the written list as the keyword candidate list of the information files later stored in the attached second stowage medium.

2. An apparatus according to claim 1, wherein said readout component reads a hierarchical structure as the search information.

3. An apparatus according to claim 2, wherein said storage converts the hierarchical structure read by said readout component into predetermined-type hierarchical structure information and stores the obtained hierarchical structure information.

4. An apparatus according to claim 1, further comprising an alarm, arranged to issue an alarm that the search information has been already written in the attached second storage medium.

5. A method to register search information for an information file which stores information files together with search information, which is used for searching the information files later, in a detachable storage medium, said method comprising:

a readout step, of reading the search information registered in an attached first storage medium;

a storage step, of storing in a storage unit the search information read in said readout step;

a checking step, of checking whether or not search information has been already written in an attached second storage medium; and a writing step, of writing the search information stored in the storage unit in said storage step in the attached second storage medium, so as to use as search information for the attached second storage medium, when it is determined by said checking step that search information is not yet written in the attached second storage medium, wherein said readout step reads a keyword candidate list as the search information, and wherein said writing step writes, in the attached second storage medium, the keyword candidate list of the information files stored in the attached first storage medium to use the written list as the keyword candidate list of the information files later stored in the attached second storage medium.

6. A method according to claim 5, wherein, in said readout step, a hierarchical structure is read as the search information.

7. A method according to claim 6, wherein, in said storage step, the hierarchical structure read in said readout step is converted into predetermined-type hierarchical structure information and the obtained hierarchical structure information is stored.

8. A method according to claim 5, further comprising an alarming step, of issuing an alarm that the search information has been already written in the attached second storage medium.

9. A storage medium which contains a program to control an information file storing information files together with search information, which is used for searching the information files later, in a detachable storage medium, said medium storing:

a readout component, arranged to read the search information registered in an attached first storage medium;

a storage component, arranged to effect storage in a storage unit of the search information read by said readout component;

a checking component, arranged to check whether or not search information has been already written in an attached second storage medium; and a writing component, arranged to write the search information stored in the storage unit by said storage component in the attached second medium, so as to use as search information for the attached second storage medium, when it 3.s determined by said checking component that search information is not yet written in the attached second storage medium, wherein said readout component reads a keyword candidate list as the search information, and wherein said writing component writes, in the attached second storage medium, the keyword candidate list of the information files stored in the attached first storage medium to use the written list as the keyword candidate list of the information files later stored in the attached second storage medium.

10. A storage medium according to claim 9, wherein said readout component reads a hierarchical structure as the search information.

11. A storage medium according to claim 10, wherein said storage converts the hierarchical structure read by said readout component into predetermined-type hierarchical structure information and stores the obtained hierarchical structure information.

12. A storage medium according to claim 9, further comprising an alarm component, arranged to issue an alarm that the search information has been already written in the attached second storage medium.

13. An information file apparatus which stores information files together with search information for the information flies in a detachable storage medium, said apparatus comprising:
   readout means for reading out a keyword candidate list registered in an attached first storage medium;
   storage means for storing the keyword candidate list read by said readout means; and
   writing means for writing the keyword candidate list stored in said storage means in an attached second storage medium,
      wherein said writing means writes, in the attached second storage medium, the keyword candidate list of the information files stored in the attached first storage medium to use the written list as the keyword candidate list of the information files later stored in the attached second storage medium.

14. An apparatus according to claim 13, further comprising input means for inputting the keyword of the information file stored in the attached storage medium.

15. An apparatus according to claim 13, further comprising capture means for capturing image information,
   wherein the image information captured by said capture means is stored in the attached first storage medium, as an image information file.

16. A method to register search information for an information file which stores information files together with search information for the information files in a detachable storage medium, said method comprising:

a readout step, of reading a keyword candidate list registered in an attached first storage medium;
a storage step, of storing in a storage unit the keyword candidate list read in said readout step; and
a writing step, of writing the keyword candidate list stored in the storage unit in said storage step in an attached second storage medium,
   wherein said writing step includes writing, in the attached second storage medium, the keyword candidate list of the information files stored in the attached first storage medium to use the written list as the keyword candidate list of the information files later stored in the attached second storage medium.

17. A method according to claim 16, further comprising an input step, of inputting the keyword of the information file stored in the attached storage medium.

18. A method according to claim 16, further comprising a capture step, of capturing image information,
   wherein the image information captured in said capture step is stored in the attached first storage medium, as an image information file.

19. A storage medium which contains a program to control an information file storing information files together with search information for the information flies in a detachable storage medium, said medium storing:
   a readout module, that reads out a keyword candidate list registered in an attached first storage medium;
   a storage module, that stores the keyword candidate list read by said readout module; and
   a writing module, that writes the keyword candidate list stored in the storage means in an attached second storage medium,
      wherein said writing module writes, in the attached second storage medium, the keyword candidate list of the information files stored in the attached first storage medium to use the written list as the keyword candidate list of the information files later stored in the attached second storage medium.

20. A medium according to claim 19, further storing an input module, that inputs the keyword of the information file stored in the attached storage medium.

21. A medium according to claim 19, further storing a capture module, that captures image information,
   wherein the image information captured by said capture module is stored in the attached first storage medium, as an image information file.

* * * * *

UNITED STATES PATENT AND TRADEMARK OFFICE
CERTIFICATE OF CORRECTION

PATENT NO. : 6,347,321 B2
DATED : February 12, 2002
INVENTOR(S) : Nozomi Masao et al.

It is certified that error appears in the above-identified patent and that said Letters Patent is hereby corrected as shown below:

<u>Title page,</u>
Item [73], Assignee,
"Canon Kabushiki Kaisha, Tokyo (JP)" should read -- Canon Denshi Kabushiki Kaisha, Saitama-ken (JP) --.

Insert: -- [*] Notice: This patent issued on a continued prosecution application filed under 37 C.F.R. § 1.53(d), and is subject to the twenty year patent term provisions of 35 U.S.C. § 154(a)(2). --.

<u>Column 2,</u>
Line 20, "an" should read -- another --;
Line 21, "other" should be deleted;
Line 22, "An another" should read -- Another --;
Line 24, "an" should read -- another --;
Line 25, "other" should be deleted.

<u>Column 3,</u>
Line 3, "a" should read -- an --;
Line 17, "of" (first occurrence) should read -- on --.

<u>Column 4,</u>
Line 3, "previously" should be deleted;
Line 64, "are" should be deleted.

<u>Column 5,</u>
Line 59, "stowage" should read -- storage --.

<u>Column 6,</u>
Line 62, "3.s" should read -- is --.

UNITED STATES PATENT AND TRADEMARK OFFICE
CERTIFICATE OF CORRECTION

PATENT NO.   : 6,347,321 B2
DATED        : February 12, 2002
INVENTOR(S)  : Nozomi Masao et al.

It is certified that error appears in the above-identified patent and that said Letters Patent is hereby corrected as shown below:

<u>Column 7,</u>
Line 21, "flies" should read -- files --.

<u>Column 8,</u>
Line 23, "flies" should read -- files --.

Signed and Sealed this

First Day of April, 2003

JAMES E. ROGAN
*Director of the United States Patent and Trademark Office*